3,478,080
PEROXY THIOLCARBONATES

Richard Anthony Bafford, Tonawanda, and Orville Leonard Mageli, Buffalo, N.Y., assignors to Pennwalt Corporation, a corporation of Pennsylvania
No Drawing. Filed July 12, 1966, Ser. No. 564,549
Int. Cl. C07c *154/00;* C08f *3/00*
U.S. Cl. 260—455                                                                   6 Claims

ABSTRACT OF THE DISCLOSURE

Organic peroxythiolcarbonates

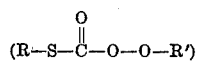

where R is alkyl, benzyl, phenyl or chlorophenyl and R' is alkyl, hydroxyl alkyl, cumyl or p-methyl; i.e., S-methyl t-butylperoxy thiolcarbonate. The compounds are useful as low temperature vinyl polymerization initiators.

---

The present invention relates to novel organic peroxides containing sulfur in the molecule, and in particular to the peroxy thiolcarbonates, and their utilization as initiators in polymerization reactions.

An object of this invention is to provide a polymerization initiator for olefinically unsaturated monomers which can be utilized at substantially lower polymerization temperatures than the present available alkyl peroxy carbonates.

COMPOUNDS

A generalized formula of the novel compounds of the present invention is represented by:

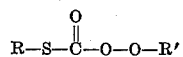

wherein, R is a radical selected from the group consisting of alkyl, aryl, aralkyl, and alkaryl and R' is a radical selected from the group consisting of alkyl and aralkyl.

PREPARATION

The peroxy thiolcarbonates of this invention may conveniently be prepared by condensing a chlorothiol formate

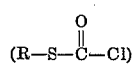

with a hydroperoxide (R'—O—O—H), in the presence of an acid acceptor, as illustrated by the following equation:

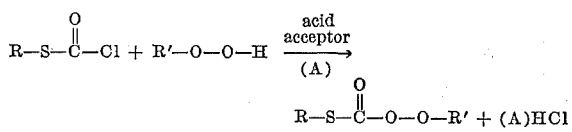

Any alkyl, aryl, aralkyl or alkaryl chlorothiolformates may be used in carrying out the process of the present invention. Illustrative compounds are the methyl, ethyl, isopropyl, n-propyl, n-butyl, n-octyl, t-butyl, benzyl, phenyl, and p-chlorophenyl chlorothiol formates.

Alkyl, hydroxyalkyl, aralkyl and alkynyl hydroperoxides which are operable in the aforementioned condensation reaction include: t-butyl hydroperoxide, t-amyl hydroperoxide, 1,1,3,3-tetramethylbutyl hydroperoxide, cumene hydroperoxide, p-methane hydroperoxide, diisopropylbenzene hydroperoxide, 2-methyl-2-hydroperoxy-4-hydroxypentane, 2,5-dimethyl hexane-2,5-dihydroperoxide, and 2,5-dimethyl hexyne-3,2,5-dihydroperoxide.

Compounds acting as acid acceptors, illustrative of those useful in carrying out the preparation of the compounds of this invention are; tertiary amines, pyridine, and alkali metal hydroxides. The tertiary amines such as triethyl amine and tributyl amine are preferred.

The following examples are given as specific illustrations of representative compounds prepared within the scope of the invention and are not to be deemed as limiting.

EXAMPLE 1

S-methyl t-butylperoxy thiolcarbonate

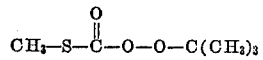

To a reactor equipped with a stirrer, a thermometer, and provided with a means for cooling the contents, was added a mixture of 11.05 g. (0.1 mole) of S-methyl thiolchloroformate, 9 g. (0.1 mole) of t-butyl hydroperoxide (99.5%), and 50 ml. of ethyl ether. The reaction mixture was cooled to —10° C. and 11.0 g. of triethyl amine was added over a period of 1-hour while maintaining this temperature. The reaction mixture was then stirred at —5° C. for 5 hours.

The precipitated amine hydrochloride was removed by filtration and washed with ethyl ether. The colorless filtrate was stripped of ether in vacuo at 0° C. A colorless oil, weighing 14.3 g. (88% yield) was obtained, and stored at —20° C. to maintain active oxygen content prior to testing in polymerization reactions.

EXAMPLES 3–5

Using the method of Example 1 and the appropriate chlorothiolformate, the following t-butylperoxy thiolcarbonates were prepared:

| Ex. No. | Compound | Yield, percent |
|---|---|---|
| 2 | S-Propyl t-butylperoxy thiolcarbonate | 84 |
| 3 | S-Octyl t-butylperoxy thiolcarbonate | 92 |
| 4 | S-Benzyl t-butylperoxy thiolcarbonate | 96 |
| 5 | S-Phenyl t-butylperoxy thiolcarbonate | 75 |

The compounds of Examples 1–5 if allowed to stand at room temperature (20–25° C.) generally decompose rapidly and vigorously but not explosively. They must be refrigerated to maintain their active oxygen content.

POLYMERIZATION

According to the present invention there is provided an improved process for the preparation of normally solid polymers or copolymers of olefinically unsaturated monomers, by contacting the monomers with sufficient peroxy thiolcarbonate as polymerization initiator, at suitable temperatures and pressures to effect the polymerization, this process being characterized by the fact that a substantially lower operating temperature can be used for the polymerization reaction than is required when the conventional alkyl peroxy carbonates are used.

It has been observed that the novel compounds of the present invention are efficient initiators for the polymerization of olefinically unsaturated monomers such as; alkenes, vinyl halides, vinyl esters, vinyl nitriles, vinylidene halides, and alkenyl aromatic (including substituted alkenyl aromatic). Typical of such monomers are ethylene, vinyl chloride, vinyl acetate, acrylonitrile, vinylidene chloride, styrene, chlorostyrenes, and alpha methylstyrenes.

The S-alkyl t-butylperoxy thiolcarbonates were found to be superior low temperature initiators. Acrylonitrile was rapidly polymerized at room temperature (25° C.)

using the S-methyl and S-propyl derivatives as the initiator.

Polymerization of olefinically unsaturated monomers: Styrene polymerization

Data obtained in the polymerization of styrene and vinyl chloride are set out in the following Tables I and II. Since the closest analogous compounds to the peroxides of this invention are the peroxy carbonates, a comparison is made with t-butylperoxy isopropylcarbonate (TBIC) and diisopropyl peroxydicarbonate (IPP) to indicate the improvement possible in polymerization rates and temperatures when using the novel initiators of this invention.

Conventional dilatometry was used to measure the rate of polymerization of styrene at 30° C. using peroxy thiolcarbonates as the initiator.

To 1 deciliter (dl.) of styrene at 0° C. was added the indicated amount of the particular peroxy thiolcarbonate initiator. The solution was placed in a calibrated dilatometer and the polymerization conducted at the indicated temperature. The rates of polymerization at various percent conversions were then calculated; these are set out in Table I below.

Vinyl chloride polymerization

The t-butylperoxy thiolcarbonates were compared as initators in the polymerization of vinyl chloride using the well-known bottle polymerization technique at autogeneous pressures. The formulation used in the evaluation is:

Vinyl chloride monomer _____ g__ 100
Water (distilled) _____ ml__ 210
Methocel (1500 cps.) (1% solution) _____ ml__ 20
Sorbitan monostearate (1% solution) _____ ml__ 10
Polyoxyethylene sorbitan monostearate (1% solution) _____ ml__ 10
Initiator _____ Variable The polymerization procedure used follows: A water suspension was prepared as set out in the above formulation, and added to a 24 ounce beverage bottle which was then frozen at − 20° C. A series of bottles was prepared and the desired amounts of peroxide initiators were then added, followed by the freshly distilled vinyl chloride. The bottles were capped, and placed in a thermostated water bath equipped to cause the rotation of the bottles end over end. After the polymerization had continued at the

TABLE I.—POLYMERIZATION OF STYRENE

| Peroxide | | Deg. C. | Amount, g./dl. | Rate of Polymerization Conversion [1] | | $\overline{DP}$, degree of polymerization | |
|---|---|---|---|---|---|---|---|
| | | | | 3% | 5% | Found | Calc. |
| | t-Butylperoxy thiolcarbonate derivative: | | | | | | |
| A | S-methyl | 30 | 0.1 | 1.91 | | 405.0 | |
| B | S-methyl | 30 | 1.0 | | 5.0 | 133.8 | 131.6 |
| C | S-octyl | 30 | 1.0 | | 5.0 | | |
| D | S-benzyl | 30 | 1.0 | 0.81 | | | |
| E | S-phenyl | 100 | 1.0 | | 8.8 | | |
| F | t-Butylperoxy isopropylcarbonate (TBIC). | 30 | 1.0 | [2] 0.06 | | | |
| G | Diisopropyl peroxydicarbonate (IPP). | 30 | [3] 1.0 | 1.20 | 1.20 | 162.6 | |
| H | IPP | 30 | 1.0 | 1.34 | | 365.4 | |
| I | IPP | 50 | 1.0 | | 4.5 | | |

[1] Moles per liter per minute ×10³.
[2] Percent initial conversion.
[3] t-Dodecylmercaptan (0.25 g./dl.) added to simulate presence of sulfur in the polymerization reaction.

In order to demonstrate that the presence of sulfur atoms in these novel peroxides does not cause termination by chain transfer, the degree of polymerization ($\overline{DP}$) of the polystyrene produced was determined in several runs. Compared were, runs A and B using S-methyl t-butylperoxy thiolcarbonate as the peroxide initiator, and runs G and H where IPP was used. As indicated, t-dodecylmercaptan was added to the polymerization recipe in run G.

The results set out in the last columns of Table I show that the presence of mercaptan (run G), caused a sharp decrease in the $\overline{DP}$ when compared to that obtained in run H.

When the polymerization was run using only one-tenth the quantity of IPP (run H) used, the S-methyl derivative (run A) still gave a faster rate and the $\overline{DP}$ of the polystyrene produced was greater despite the fact that the rate was greater. It is a general rule of this art that, all things being equivalent, the faster the rate of polymerization the lower the $\overline{DP}$ obtained.

The $\overline{DP}$ for run B, where the rate of polymerization was much greater, corresponds closely to the calculated value as determined by use of the relationship that the $\overline{DP}$ is approximately inversely proportional to the rate of polymerization. (See "Principles of Polymer Chemistry," by Paul J. Flory, Cornell University Press, Ithaca, N.Y. (1953) at p. 138.)

The above results indicated that the S-methyl t-butylperoxy thiolcarbonate has a substantially faster rate of polymerization than IPP in styrene polymerization at 30° C.

desired temperature for a specified time, the bottles were cooled, vented of excess vinyl chloride monomer, and the yield of polyvinyl chloride determined gravimetrically.

A comparison of the two alkyl t-butylperoxy thiolcarbonates with di-isopropyl peroxydicarbonate (IPP) was made using the above procedure.

TABLE II.—POLYMERIZATION OF VINYL CHLORIDE AT 30° C.

| Peroxide | | Phr.[1] | Percent conversion |
|---|---|---|---|
| J | S-octyl-t-butylperoxy thiolcarbonate | 0.30 | 62.5 |
| K | S-methyl-t-butylperoxy thiolcarbonate | 0.10 | 85.0 |
| L | Di-isopropyl peroxydicarbonate (IPP) | 0.153 | 85.0 |

[1] Phr.=parts per 100 parts of monomer.

Runs K and L indicate that the S-methyl derivative is a superior iniator for the polymerization of vinyl chloride, when compared to IPP. The amount of IPP needed to give an equivalent percentage conversion at 30° C. is about 50% greater, yet IPP is considered by the art to be one of the fastest and most efficient low temperature initiators available.

Thus having described the invention what is claimed is:
1. Peroxy thiolcarbonates of the formula:

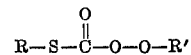

where

R is alkyl having 1–8 carbon atoms, benzyl, phenyl, or chlorophenyl; and

R' is alkyl having 1–8 carbon atoms, 3-hydroxy-1,1-dimethylbutyl, cumyl or p-menthyl.

2. Peroxy thiolcarbonates of claim 1 where R' is t-butyl.
3. Peroxy thiolcarbonates of claim 1 where the radical R is alkyl having 1–8 carbon atoms.
4. S-methyl t-butylperoxy thiolcarbonate.
5. S-benzyl t-butylperoxy thiolcarbonate.
6. S-phenyl t-butylperoxy thiolcarbonate.

References Cited

UNITED STATES PATENTS 2,553,777   5/1951   Hawley et al. ____ 260—455 XR
2,795,525   6/1957   Stansbury et al. __ 260—455 XR CHARLES B. PARKER, Primary Examiner D. R. PHILLIPS, Assistant Examiner U.S. Cl. X.R.

260—85.5, 85.7, 86.1, 87.5, 87.7, 88.1, 88.7, 89.1, 91.5, 91.7, 92.8, 93.5, 94.9